(12) United States Patent
Boyd et al.

(10) Patent No.: US 6,337,916 B1
(45) Date of Patent: Jan. 8, 2002

(54) MODIFYING IMAGE DATA

(75) Inventors: Martin David Boyd, Marina Del Rey; Marc Hawlitzeck, Los Angeles, both of CA (US)

(73) Assignee: Discreet Logic Inc., Quebec (CA)

( * ) Notice: Subject to any disclaimer, the term of this patent is extended or adjusted under 35 U.S.C. 154(b) by 0 days.

(21) Appl. No.: 09/285,557

(22) Filed: Apr. 2, 1999

Related U.S. Application Data

(63) Continuation-in-part of application No. 09/055,091, filed on Apr. 3, 1998, now abandoned.

(51) Int. Cl.$^7$ ................................................. G06K 9/00
(52) U.S. Cl. ..................................................... 382/103
(58) Field of Search ................................. 382/100, 103, 382/154, 180, 285; 348/169; 345/326, 327, 328, 333, 334, 335, 339, 433, 437, 438, 439, 473, 474, 475, 501

(56) References Cited

U.S. PATENT DOCUMENTS

| | | | |
|---|---|---|---|
| 4,524,421 A | | 6/1985 | Searby et al. ................ 345/431 |
| 4,602,286 A | | 7/1986 | Kellar et al. ................. 348/597 |
| 5,175,625 A | | 12/1992 | Miles .......................... 348/563 |
| 5,216,755 A | | 6/1993 | Walker et al. ............... 345/432 |
| 5,592,599 A | * | 1/1997 | Lindholm .................... 345/427 |
| 5,708,845 A | * | 1/1998 | Wistendahl et al. ......... 345/302 |
| 5,867,166 A | * | 2/1999 | Myhrvold et al. ........... 345/419 |
| 6,064,393 A | * | 5/2000 | Lengyel et al. .............. 345/427 |
| 6,121,981 A | * | 9/2000 | Trower, II et al. ........... 345/473 |
| 6,144,385 A | * | 11/2000 | Girad .......................... 345/424 |
| 6,160,907 A | * | 12/2000 | Robotham et al. ........... 382/154 |

FOREIGN PATENT DOCUMENTS

| | | | | |
|---|---|---|---|---|
| WO | WO 85/02080 | 5/1985 | .... H04N/5/14 .... |

\* cited by examiner

*Primary Examiner*—Andrew W. Johns
*Assistant Examiner*—Shervin Nakhjavan
(74) *Attorney, Agent, or Firm*—Gates & Cooper LLP

(57) ABSTRACT

Image data representing a moving image by a sequence of image frames each containing an array of pixels. A distinctive characteristic of an image frame is identified and image data is modified in response to process iterations. For each iteration, a tracking parameter is generated (1504) and the rendering of said object is controlled (1506) in response to the tracking parameter. An output image is displayed in response to the application of the controlled object so that tracking and display operations are performed on a frame-by-frame basis to facilitate creative manipulation of control parameters and tracking locations.

40 Claims, 18 Drawing Sheets

MODIFYING IMAGE DATA

This is a continuation-in-part of U.S. application Ser. No. 09/055,091, entitled "MODIFYING IMAGE DATA," filed on Apr. 3, 1998 now abandoned, by Martin David Boyd.

FIELD OF THE INVENTION

The present invention relates to modifying image data representing a moving image by a sequence of image frames each containing an array of pixels.

BACKGROUND OF THE INVENTION

Procedures for modifying image data representing a moving image by a sequence of image frames each containing an array of pixels are known. It is known to identify a distinctive portion of an image, perceived by the eye as representing a distinctive component or item within the image frame. A tracking operation is then performed on a frame-by-frame basis in order to follow movement of the item for the duration of a video clip. This results in displacement vectors being generated representing movement of the item on a frame-by-frame basis. This information is stored and may then be used to define how a mask or a matte should move on a frame-by-frame basis in order to perform a compositing process.

A problem with known tracking procedures of this type is that they are often directed towards performing a particular operation in a procedural and non-interactive way. The present inventors have realised that item movement within a scene, over a video clip, is often interactive and that movement characteristics of one item, which may be tracked, will often have temporal significance with reference to other movement occurring within the clip. Thus, there has been a realisation to the effect that tracking data could be used for more creative purposes if the tracking procedures could be carried out within a more interactive environment.

SUMMARY OF THE INVENTION

According to a first aspect of the present invention, there is provided image data processing apparatus configured to process image data representing a moving image by a sequence of image frames, wherein each of said image frames contains an array of pixels, including identifying means configured to identify a distinctive characteristic of an image frame defined by pixel transitions; generating means configured to generate a tracking parameter in response to tracking the position of said distinctive characteristics; controlling means configured to control an object in response to said tracking parameter; and display means configured to display an output image in response to the application of said controlled object upon an image frame.

In a preferred embodiment, the identifying means is configured to identify a plurality of distinctive characteristics, said generating means is configured to generate a first tracking parameter in response to tracking the position of a first distinctive characteristic, and configured to generate a second tracking parameter in response to tracking the position of a second distinctive characteristic and to generate a combined tracking parameter by combining the first tracking parameter and a second tracking parameter, wherein the controlling means is configured to control the object in response to the combined tracking parameter.

According to a second aspect of the present invention, there is provided a method of modifying image data representing a moving image by a sequence of image frames each containing an array of pixels, including the steps of: identifying a distinctive characteristic of an image frame defined by pixel transitions; and modifying image data in response to a plurality of process iterations, wherein each of said process iterations comprises the step of generating a tracking parameter in response to tracking the position of said distinctive characteristic, controlling an object in response to said tracking parameter, and displaying an output image in response to the application of said controlled object upon an image frame.

DETAILED DESCRIPTION OF THE PREFERRED EMBODIMENTS

The invention will now be described by way of example only with reference to the previously identified drawings.

Figure 1:
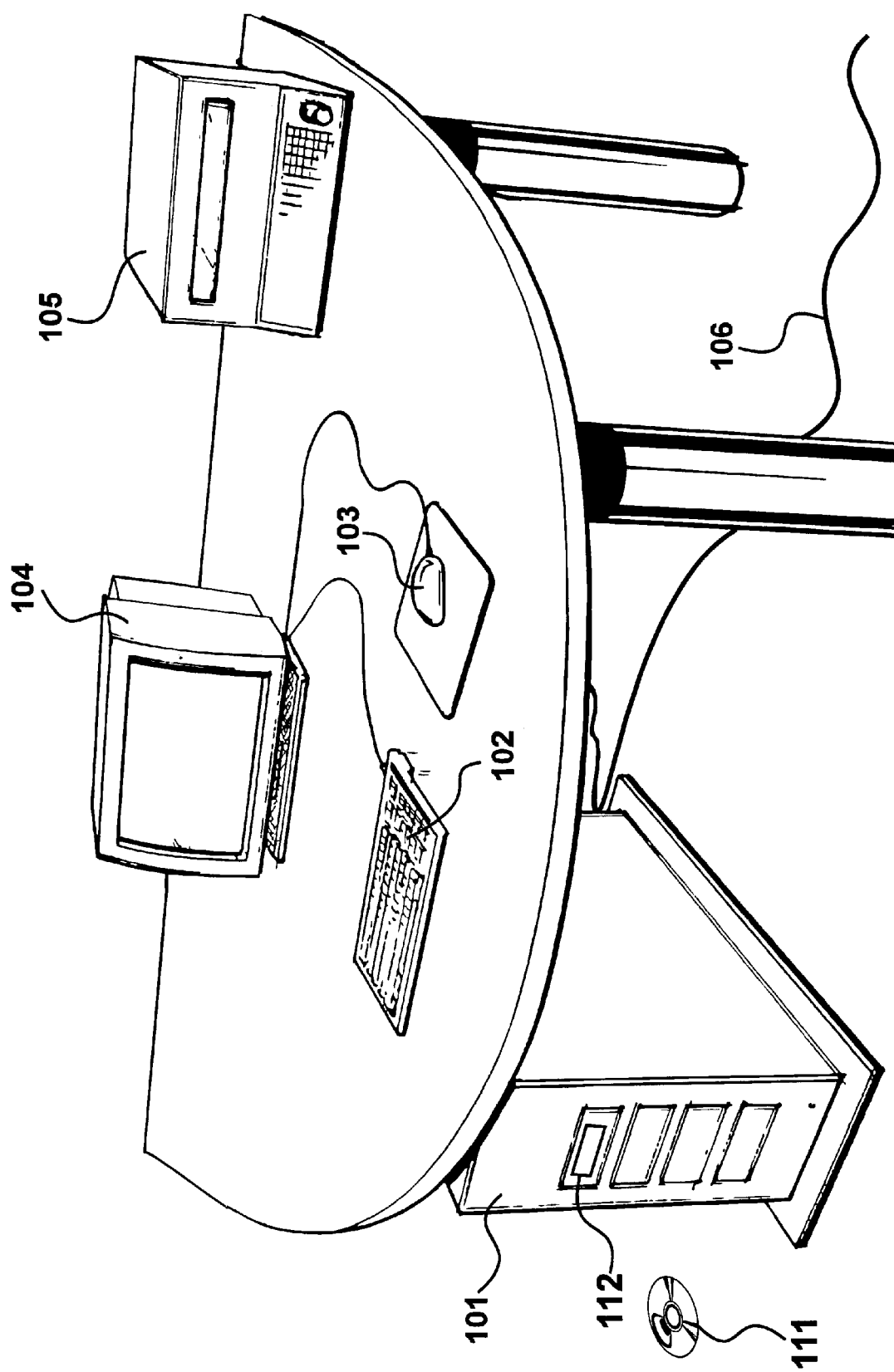
FIG. 1 shows an image processing station, having a data processing system, storage apparatus and control devices.

An image processing station is shown in FIG. 1 having a data processing system 101 configured to receive manual input commands from a keyboard 102 and a mouse 103. A visual output interface is provided to an operator by means of a Visual Display Unit 104. Video source material is supplied to processing system 101 from a high quality digital video tape recorder 105 and edited material may be recorded back to said tape recorder. In addition to providing a facility for the storage of digital video data on tape, image data, representing a moving image by a sequence of image frames, may be recorded on other media, such as magnetic or optical disks. Furthermore, image data files may be exchanged between other similar systems via an Ethernet network cable 106.

Operating instructions executable by the processing system 101 are received by means of a computer-readable medium such as a CD ROM 111 receivable within a CD ROM player 112.

Figure 2:
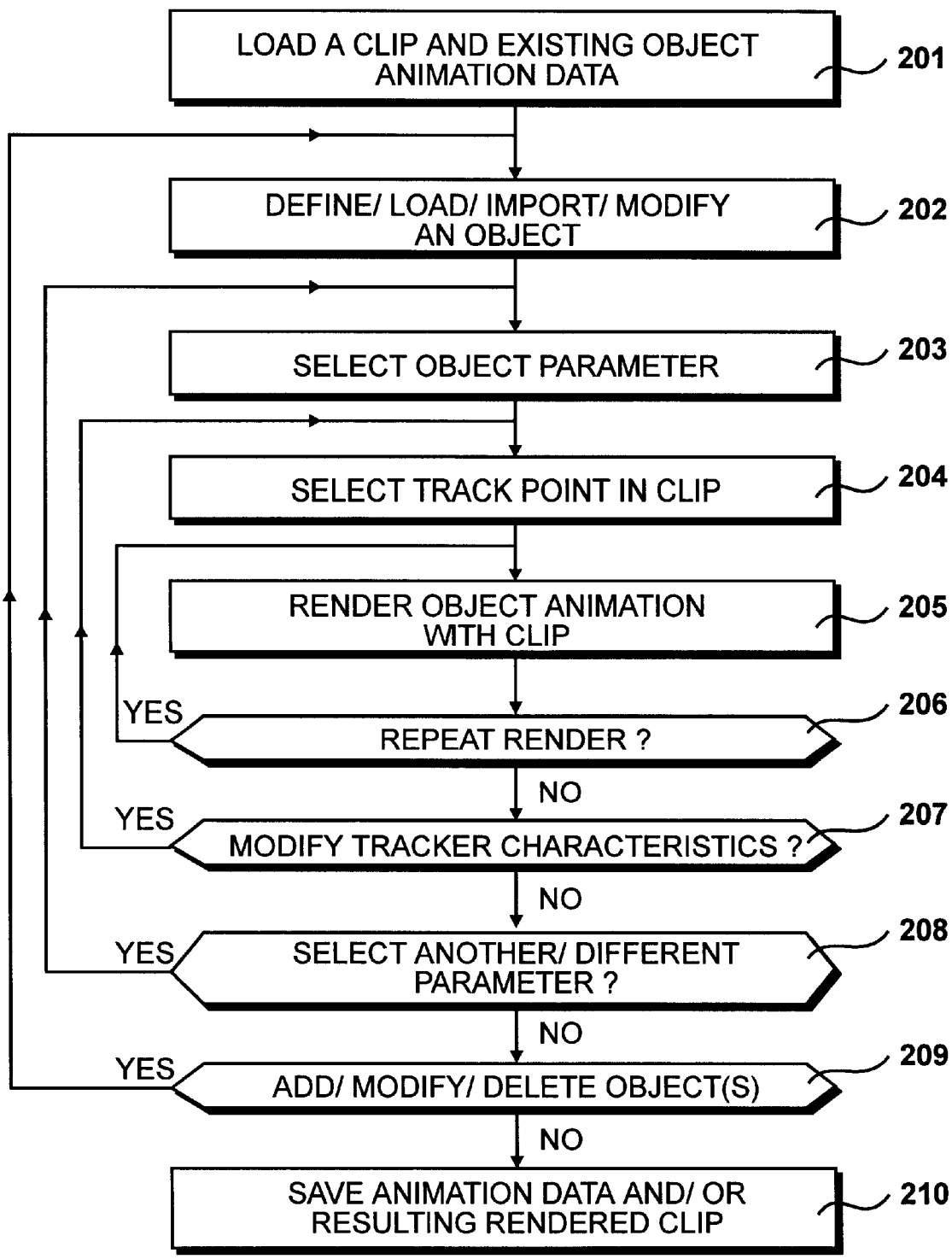
FIG. 2 identifies operations performed by the image processing station identified in FIG. 1.

Operations performed by the image processing station, when implementing the present preferred embodiment, are illustrated in FIG. 2. At step 201 image data representing a moving image by a sequence of image frames each containing an array of pixels are loaded. Such data is often derived from recorded video and a short sequence of such data is often referred to as a "clip". Thus, a tape may be loaded into tape recorder 105 and played under the control of the data processing system 101 so as to supply image frames to said data processing system.

The image data loaded to the data processing system is modified in order to produce new output image data having an artistic compositing process supplied thereto. The artistic modification involves changing pixel values present within image frames or adding new pixel values to the existing image frames. The modification is achieved in response to a collection of data which is unified in itself and is referred to herein as an "object".

As used herein, an object may identify something which becomes visible and identifiable, i.e. a perceived object, within the modified image data or the object data may merely define parameters for controlling the existing data. Thus, at step 202 an object is defined, loaded from storage, imported from an external source or modified as required in order to specify an object of the required type. Furthermore, the object has at least one parameter which may be adjusted, usually with respect to time, so as to adjust the way in which the object operates over the duration of the clip.

At step 203 one of the object's parameters is selected and it is this parameter which will be controlled so as to control the object in response to a tracking parameter.

At step 204 a position within an object frame is selected as a tracking point. This allows a tracking parameter to be generated in response to tracking the position of a distinctive characteristic of an image frame defined by pixel transitions. Thus, a position for tracking purposes is often identified as a particular small region within an image frame or an image frame transition, representing a point at which pixel values change abruptly so as to create the impression of an image boundary.

After an object parameter has been selected at step 203 and a track point has been selected at step 204, object frames are generated by rendering output clips while the object animation progresses. Thus, an operation of step 205 results in an image clip being read and the object being animated such that the combined result is rendered on a frame by frame basis. The tracking and the rendering are performed in real time, thereby significantly enhancing user interactivity although, in some embodiments, the rate at which output frames are produced may be less than real-time video rate if substantially large data sets are being processed. Under these circumstances frames may be missed out, or a less than full bandwidth frame rate selected, in order to provide full user-interaction with moving images with minimum interruption of editing processes. A high quality render may then be performed at less than real time rates, once the desired results have been closely approximated. However, it should be understood that it is the aim of the present embodiment to provide full user-interactivity with high quality rendered images wherever this is possible, as clearly, this will affect the accuracy with which high quality effects may be achieved.

After the rendering process has been viewed, a question is asked at step 206 as to whether the render is to be repeated. Thus, when answered in the affirmative, control is returned to step 205 and the rendering process is repeated, thereby allowing an operator to consider the rendering operation several times before committing it or deciding upon its modifications.

If the defined render is not to be repeated, the question asked at step 206 is answered in the negative and at step 207 a question is asked as to whether tracker characteristics are to be modified. If this question is answered in the affirmative, control is effectively returned to step 204 and the user is invited to select new tracking points in the clip. Thus, having viewed an animation, a user may decide that a more appropriate track point should be selected and such a selection may be repeated, by answering the question asked at step 207 in the affirmative for an appropriate number of times, until an ideal track point has been identified.

In some circumstances it is possible that a selected effect produces results which are less than ideal because an inappropriate object parameter has been selected. Thus, at step 208 a question is asked as to whether another or a different parameter should be selected and when answered in the affirmative control is returned to step 203. Thus, a different parameter may be selected at step 203, whereafter a track point may be selected for this parameter and a new animation may be rendered at step 205. Thus, parameter selection may be modified as many times as is required and during each of these modifications new track positions may be selected. Given that the rendering is performed in real-time, or near real-time many interactive modifications may be viewed before a particular rendering process is committed to an output source.

At step 209 a question is asked as to whether new objects are to be added or existing objects are to be deleted. When answered in the affirmative control is returned to step 202 allowing objects to be deleted or new objects to be defined, loaded or imported etc.

Thus, it should be appreciated that a user may rapidly modify a position of a track, modify object parameters or modify the type of object that is being animated, in an interactive environment. Eventually, the user will have achieved the desired result whereafter the animation data, possibly with or without the resulting rendered clip, is saved at step 210.

Figure 3:
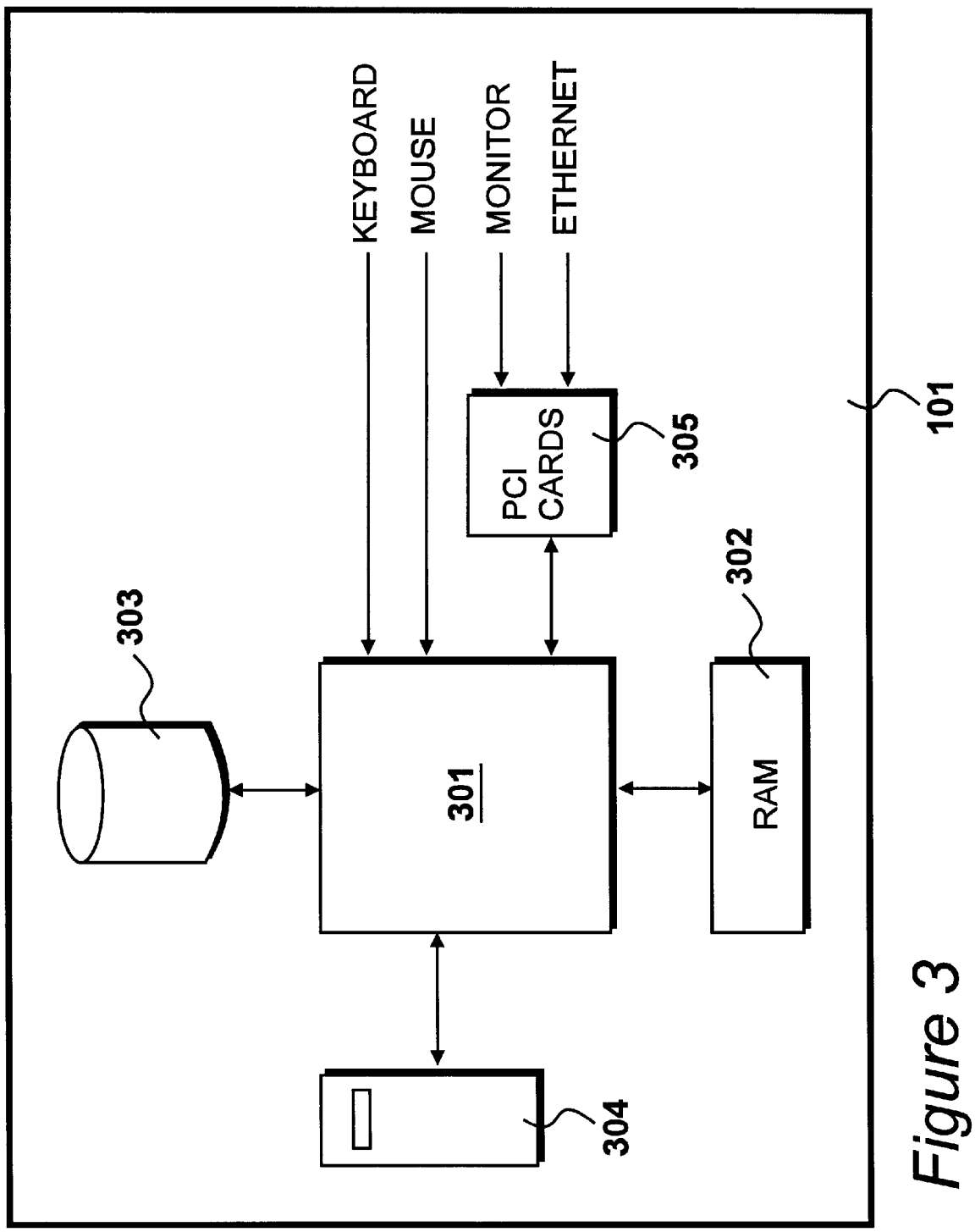
FIG. 3 details the processing system identified in FIG. 1.

Processing system 101 is detailed in FIG. 3, configured around a thirty-two bit Intel central processing unit operating under the control of a thirty-two bit conventional operating system, such as "Windows NT" or "Windows '95". Central processing unit 301 communicates with Random Access Memory device 302 providing sixty-four megabytes of data storage and with a hard disk device 203 providing two point three gigabytes of storage. In addition, the permanent storage capabilities are enhanced by a removable hard disk device 304 and communication with external devices occurs via a PCI interface 305.

Figure 4:
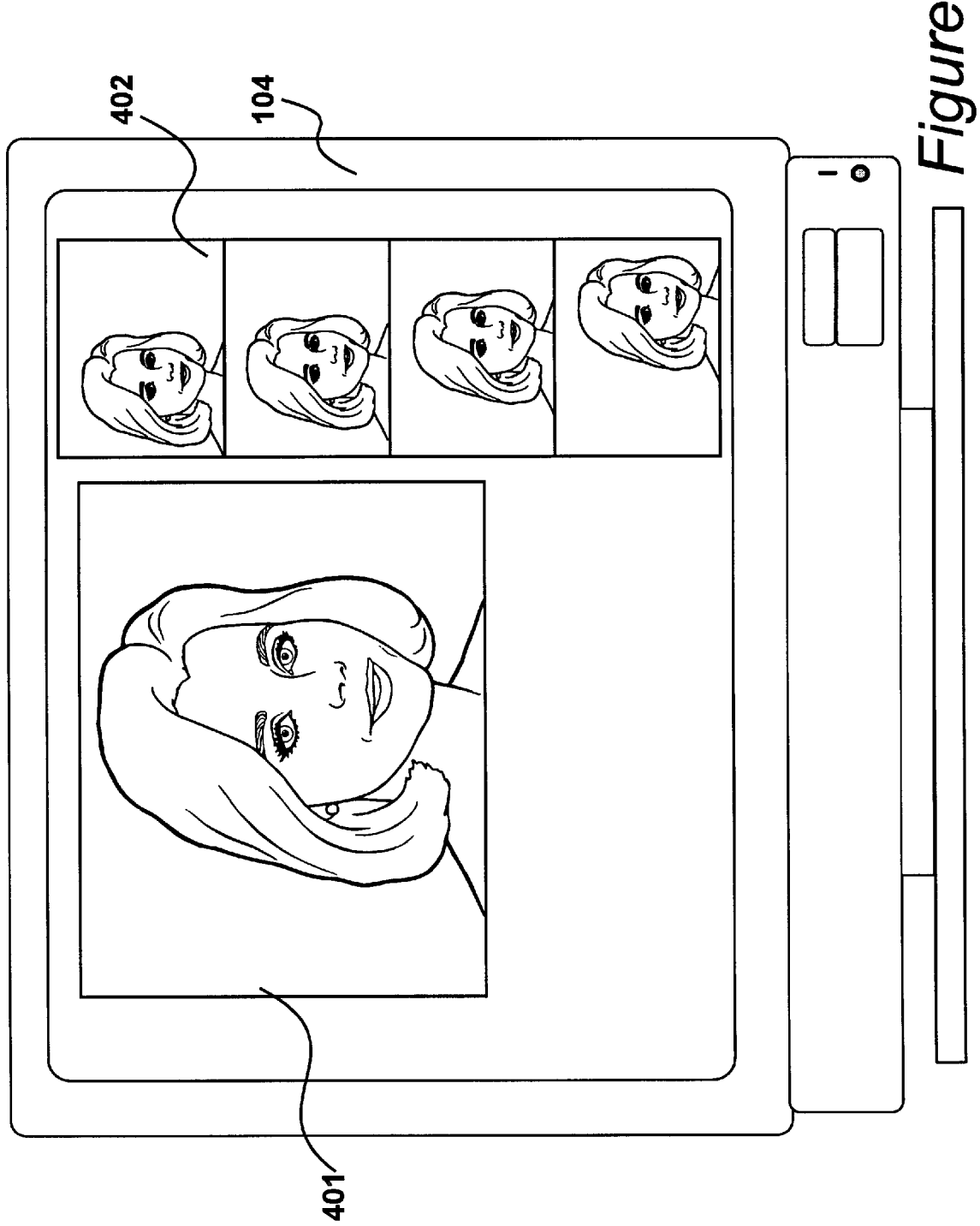
FIG. 4 identifies images displayed on the Visual Display Unit shown in FIG. 1, when implementing procedures running on said processing system.
Figure 5:
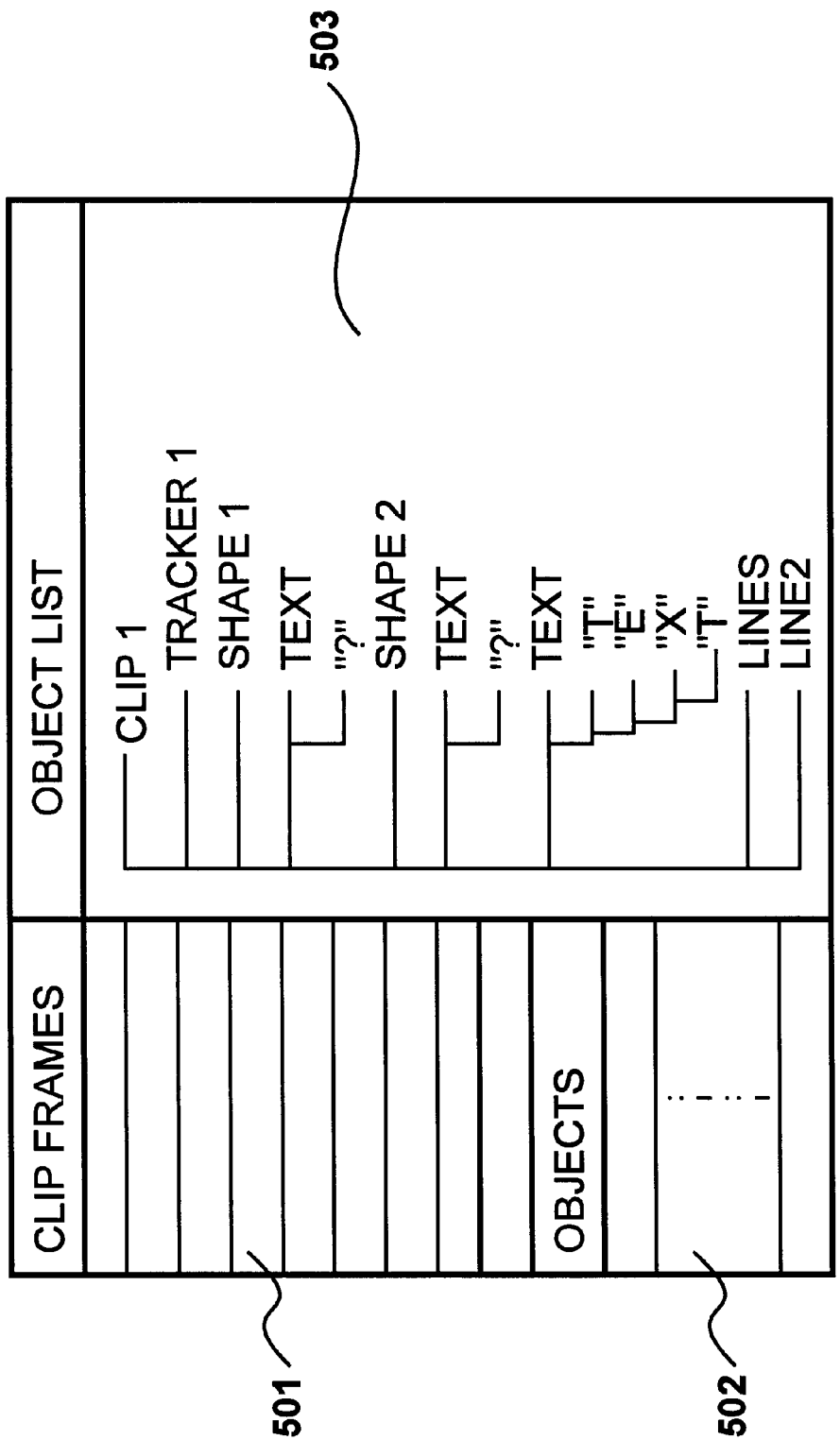
FIG. 5 illustrates the arrangement of stored data in the Random Access Memory device identified in FIG. 3

VDU 104 is shown in FIG. 4, representing an operating state after an image clip has been loaded at step 201. An individual image frame is displayed in an image window 401 and a plurality of smaller frames are illustrated as a clip in a second window 402. The images shown in clip window 402 may represent adjacent frames or, alternatively and preferably, may represent a plurality of displaced frames, so as to provide an indication of action occurring for the duration of the clip under consideration. Object animation data is read from local storage (either drive 303 or drive 304) and written to Random Access Memory device 302. The structure of animation data stored in Random Access Memory device 302 is illustrated in FIG. 5.

Animation data loaded at step 201 consists of an indication of clip frames, at region 501, an indication of object data, at region 502 and a structured object list at region 503 defining an order and a structure or the inter-relationship of the object 502 with the clip frames defined at 501. Furthermore, in order to facilitate the generation of overall effects, the structured object list may be displayed on monitor 104 as shown in FIG. 6 and the relationship between the objects, as defined by the structured object list, may be modified directly, in response to manual operation of the keyboard 102 or the mouse 103, while viewing the list as displayed in FIG. 6.

Operations performed by central processing unit 301 considers the references within the structured object list as "objects". Thus, the list displayed on monitor 104 in FIG. 6 may be considered as comprising a plurality of structured objects. Some of these objects are in fact functions that are used to affect properties of other objects. Thus, the object list is initiated by reference to a clip object 601, followed by reference to a tracker 602 and a shape object 603. This is followed by a text object 604, a second shape object 605 and a second text object 606. A third text object 607 is shown consisting of the individual character objects "T" 608, "E" 609, "X" 610 and "T" 611. Finally, the list includes a graphic line object 612 followed by a second graphic line object 613.

Figure 6:
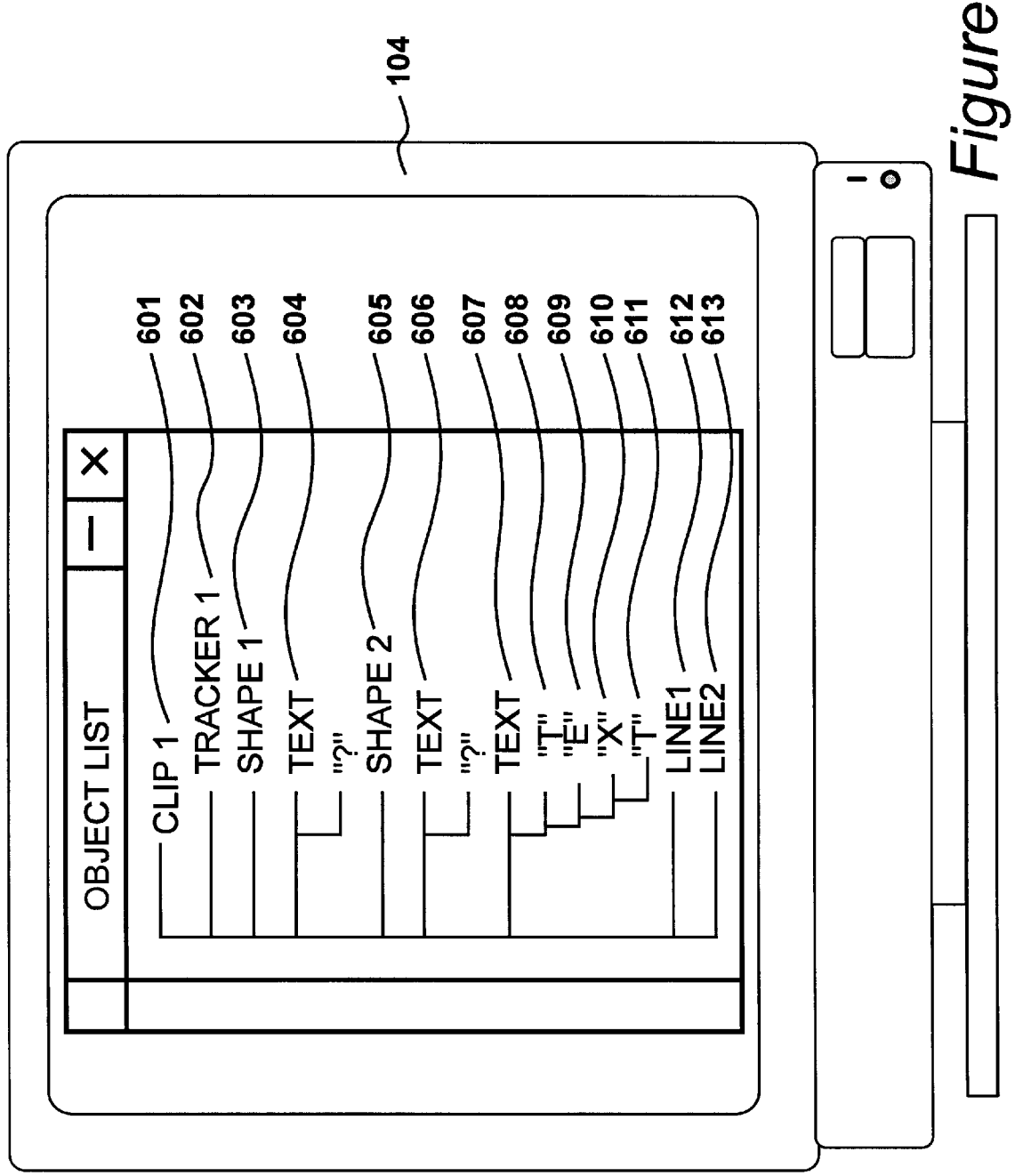
FIG. 6 illustrates a display of an object list as stored in memory as shown in FIG. 5.
Figure 7:
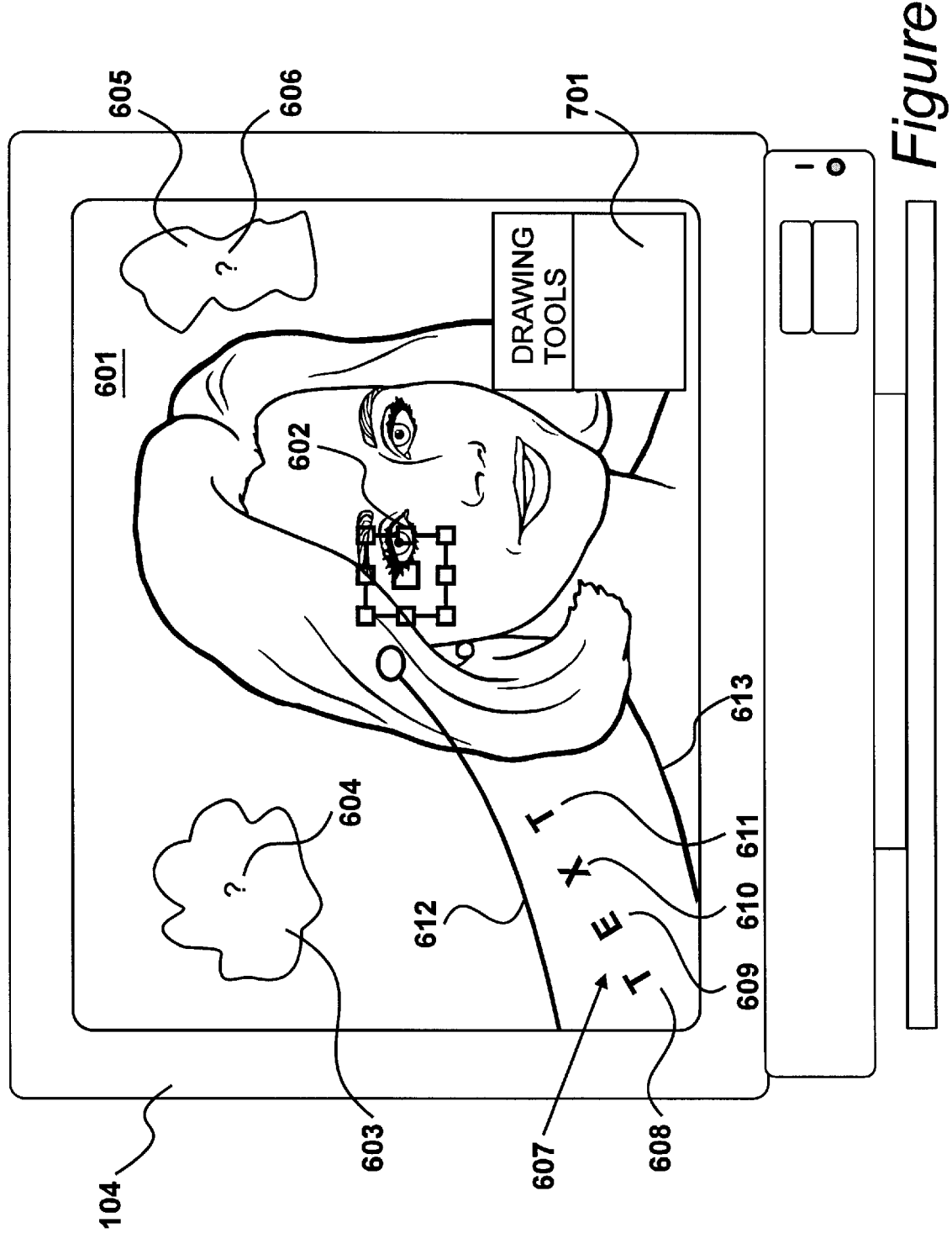
FIG. 7 shows a graphical representation of the objects identified in FIG. 6.

The screen display shown in FIG. 4 represents a clip preview mode, whereas the screen display shown in FIG. 6 represents an object preview mode; each accessible after loading clip and animation data at step 201. Thereafter, an operator selects a combined mode so as to allow definitions to be made in accordance with step 202, which result in an image frame, such as that shown in window 401, expanding to occupy the full screen size of monitor 104 as illustrated in FIG. 7. Furthermore, other objects defined by the structured object list 503 are also displayed in their true graphical object representations.

Outputs image frames are produced by rendering objects defined in the object list and the order in which this rendering is done, so as to present the objects in hierarchical layers, will be dependent upon their order in the structured object list.

The objects shown graphically in FIG. 7 have been given identical reference numerals to their structural representation as shown in FIG. 6. Objects shown in FIG. 7 may be selected by manual operation of mouse 103 and their characteristics may be modified. Thus, modifications may be made to objects with reference to the interface display shown in FIG. 6 or with reference to the interface display shown in FIG. 7. In addition, control boxes may be selected allowing particular control parameters to be controlled and modified so as control the operation of the objects on a frame-by-frame basis.

Figure 8:
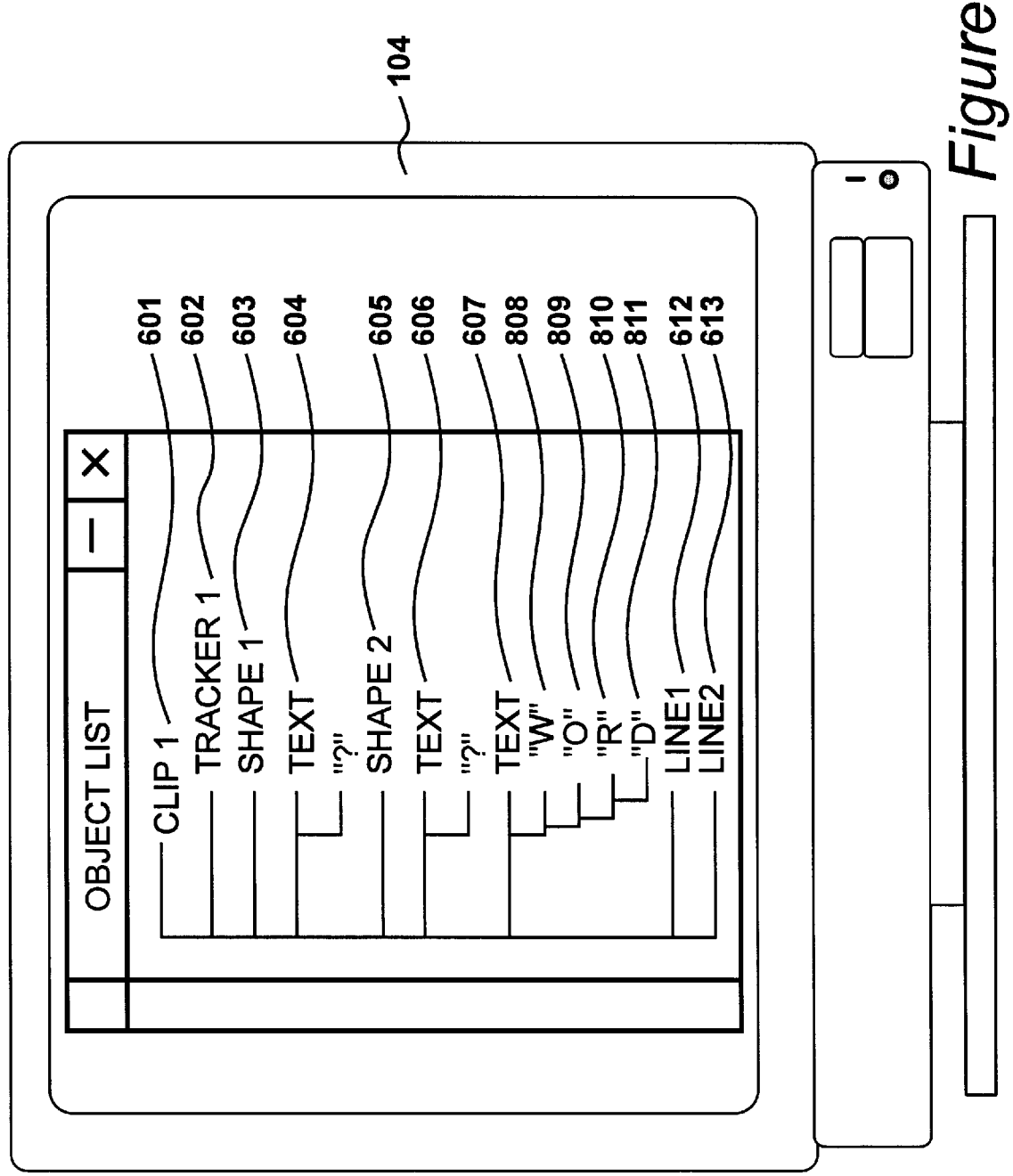
FIG. 8 illustrates the result of an object modification.

At step 202 objects may be modified and an example of object modification is shown in FIG. 8. The structured object list shown in FIG. 6 may be edited by selecting text positions and retyping text at selected positions. The result of such an operation being performed is shown in FIG. 8. Object 608 has been modified to object 808, object 609 has been modified to object 809, object 610 has been modified to object 810 and object 611 has been modified to object 811. Thus, in combination, textural object 607 now represents the word "word" whereas before it represented the word "text".

Figure 9:
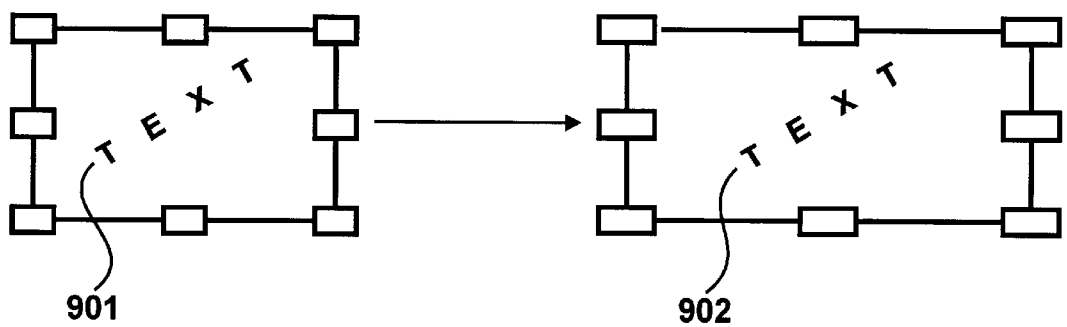
FIGS. 9, 10 and 11 illustrated the effects of object modifications.

In addition to the objects being displayed in the combined view shown in FIG. 7, a drawing tool window 701 is also displayed, facilitating graphical modifications to the displayed objects. An example of a graphical modification is illustrated in FIG. 9 in which object 607, representing the word "text" is effectively stretched along its length such that at 901 the object has a particular length while at 902 its length has been increased.

Figure 10:
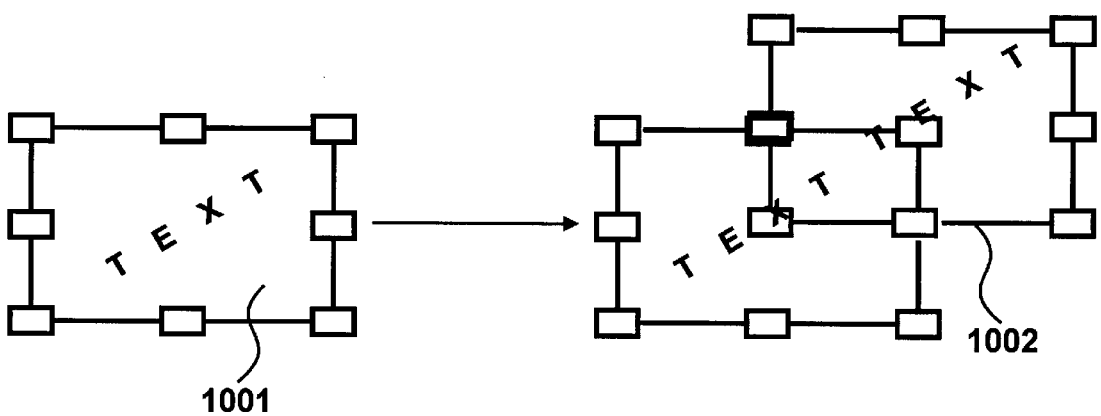

A similar manipulation is illustrated in FIG. 10 in which object 607 has been translated. Thus, with reference to the image frame, the object has a first position at 1001 and a different position, after the translation, illustrated at 1002.

Figure 11:
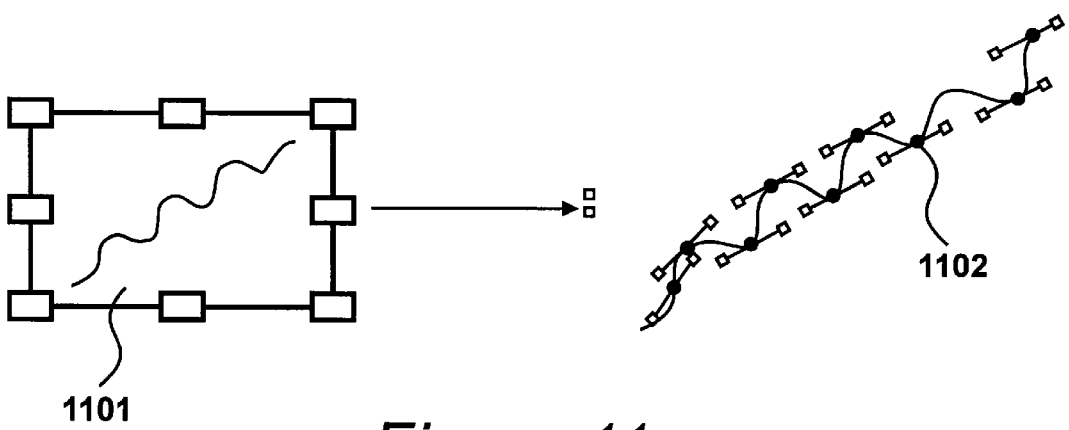

More sophisticated modifications may be effected as illustrated in FIG. 11. In this example, particular nodes are specified at positions within the object, as shown at 1101 and these positions are changed, using a node editing process, as represented at 1102. Thus, it can be appreciated that objects may be modified at step 202 using many different editing techniques. Thus, when combined with other objects, as defined by the structured object list, object 606, for example, may be represented in its form shown at 901 or it may be represented in its form shown at 902.

In addition to having fixed characteristics, objects have parameters which may be modified over time on a frame-by-frame basis. At step 203 object parameters are selected. Each object has a list of inimitable transformations appropriate for selection at step 203. Furthermore, it is possible to create additional transformations for animation within the process. Thus, the transformation of object 607 has been described such that the object may be represented as shown at 901 or as shown at 902. A substitution of this type may be performed if an object is not being represented in its desired form, prior to an animation being established. Alternatively, the transformation may provide the basis for an animation. Under these circumstances both the original object, as illustrated at 901 and the modified object, as illustrated at 902, are retained. These retained objects may be considered as extreme conditions with intermediate objects being defined by interpolating conditions defined at these extremes.

Animation takes place over a number of frames, usually linearly with respect to time. However, in accordance with a preferred embodiment, the modification is associated with the tracking operation thereby enhancing the realism of the effect, given that it becomes synchronised to real movement seen within the clip. The tracking procedure allows a distinctive characteristic of an image frame to be identified that is defined by pixel transitions.

Image data is modified on a frame-by-frame basis therefore each frame modification may be considered as a process iteration. Each process iteration generates a tracking parameter in response to tracking the position of the distinctive characteristic. An object is controlled in response to this tracking parameter and an output image is displayed in response to the application of the controlled object upon an image frame.

Figure 12:
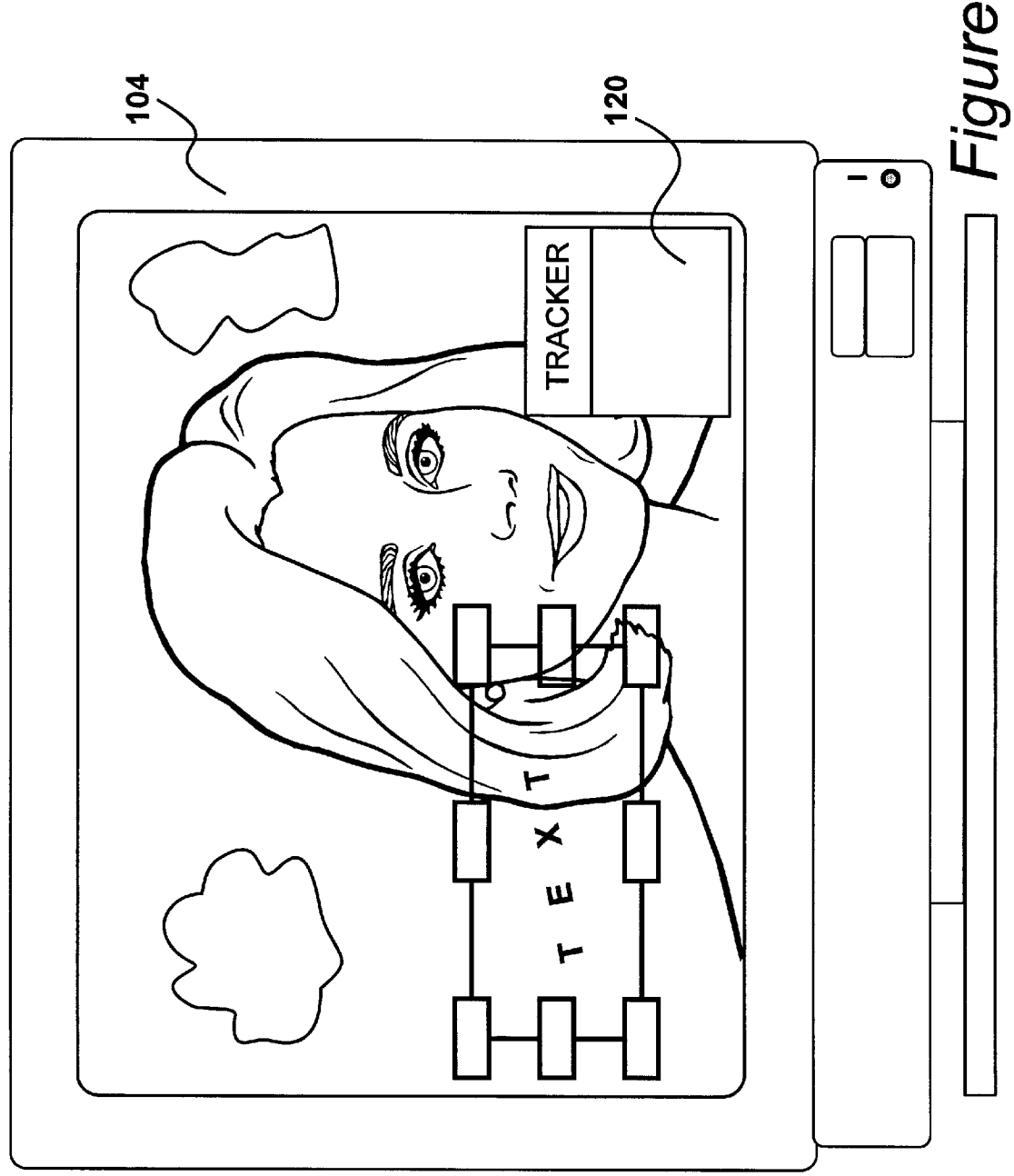
FIG. 12 illustrated the selection of a graphically displayed object, including the display of a tracker window.

At step 203, object parameters are selected which represent parameters that will be adjusted in response to the tracking parameter. As shown in FIG. 12, a particular graphically displayed object is selected, resulting in a tracker control window 1201 being activated. An active tracker control window is detailed in FIG. 13. The tracker control window displays a plurality of selectable buttons 1301 to 1311 configured to define parameters of the object that will be controlled in response to the tracking parameter.

Button 1301 turns off all active trackers for the currently selected object or group of objects, disabling tracking operations. Button 1302, when pressed, creates a single tracker which can modify the position of selected objects. Button 1303, when pressed, creates a pair of trackers, whose relative position can be used to modify the scale of selected objects. Button 1305, when pressed, creates a pair of trackers whose relative position can be used to modify the rotation of selected objects. Any combination of buttons 1302, 1303 and 1305 can be selected, thereby facilitating any combination of position, scale and rotation transformations to be applied to currently selected objects. Button 1304 brings up a pop-up menu allowing tracker settings to be loaded and saved.

The mode button 1351 enables selection of one of two tracker modes: relative and absolute. In relative mode, the tracked position and rotation will be added to the initial position and rotation of the object, and if scaling is applied, then the scale factor from the trackers will be multiplied by the objects initial scale. In absolute mode, the object's properties before tracking was applied are ignored, and the position, scale and rotation are set to values supplied from the tracker alone. The position button 1352 determines which position properties can be modified by the tracker. The possibilities are X only, Y only or both X & Y. X & Y is the default.

Button 1308 facilitates continuous forward movement through a clip, with similar operations being performed in reverse in response to the operation of button 1307. Single stepping through the frames in the forward direction is provided by the activation by button 1309 with similar operations in the reverse direction being provided by the operation of button 1306. Object conditions may be specified with respect to particular frames within the clip and non-specified frame positions are then derived by a process of interpolation.

The tracking operation may be performed in a number of different ways. Tracking may be performed with reference to either a fixed or roaming reference, and this is selected by menu button 1310. The tracker contains an inner and an outer box. When a fixed reference is selected, as shown at 1310 in FIG. 13, the area contained within the inner tracker box at the start of tracking is stored. This is considered as a reference image. In the next frame, a search is made for image data that closely matches the stored inner box data from the first frame. The search is performed within the area of the outer tracker box. Thus, as a point moves across the image, it will be possible for the tracker to follow it, provided its movement is not so rapid as to cause the point to move beyond the area of the outer tracker box between successive frames. By keeping the size of the tracker box small, the amount of processing required to search the outer tracker box remains relatively small. Thus, for slowly moving targets, tracking can be relatively efficient. For faster moving targets the outer tracking box can be enlarged. However this can make tracking more processor intensive and less reliable. Variability of tracking box sizes is provided so that the user can optimise the tracker for the particular conditions encountered within a sequence of image frames, and thereby maintain reliability and efficiency of processing across a wide range of image conditions. With a fixed tracking reference, the search of all subsequent frames is always made by performing a comparison with the contents of the inner tracking box stored from the first frame of the tracking process.

When the point to be tracked is changing in some way, perhaps shrinking or increasing gradually in size, a roaming reference can be selected using the menu button 1310. With a roaming reference, the contents of the search reference image are updated at each frame whenever a match is found. Thus, as each new image frame is analysed, the search reference is updated whenever a successful match has been found, thereby enabling points, shapes and patterns that are gradually changing to be tracked successfully.

A snap button 1311 affects the way in which a fixed reference tracking operation is performed. A roaming reference introduces accumulating errors, and so is usually only used as a last resort. When the snap operation is used, the fixed reference can be updated at the user's discretion, thereby combining the advantages of both the fixed and roaming modes of operation, at the cost of requiring additional user-intervention. As a fixed reference tracking operation proceeds, the user can apply the snap operation at any time, possibly proceeding a frame at a time to check results carefully. When snap is activated, the image data in the inner tracker box is recorded as the new fixed reference data, and subsequent tracking correlations are performed with respect to the new fixed reference. A roaming reference may be considered as having a snap on every frame, and in this respect it may be understood that the roaming mode of operation is more unpredictable than the fixed or fixed-with-snap modes of operation.

A tolerance control 1353 is provided for tracking operations. This sets the threshold used by the tracker to determine if it has tracked an object to the next frame correctly. The tracker searches for the point within its search area that has the highest probability or correlation of being the correct tracking point. If the probability is less than the threshold determined by the tolerance control 1353, then it is assumed that the tracker has failed to track correctly for the present frame, and the tracker data for that frame is ignored. It is possible that the tracker will be able to make a definite match in a subsequent frame, and interpolation can then be used in order to determine a tracker value for the frame when the tracker was unable to make a match.

At step 204 a track point is selected in the clip, as illustrated at 602 in FIG. 7. Tracker selection object 602 shown in FIG. 7 is detailed in FIG. 14. The tracker selection object includes an internal box 1401 and an external region 1402. The most important aspect of the tracker selection box essentially consists of the positioning of the inner box 1401, effectively identifying a distinctive characteristic within the image from which tracking parameters are determined. Outer box 1402 identifies a region in which searching procedures will be performed and, in general, more accurate tracking is facilitated by increasing the size of box 1402, while processing overhead is reduced by reducing the size of the box. Thus, an optimal size for the outer box 1402 should be selected in order to achieve the required accuracy of tracking while at the same time not placing an unnecessary processing requirement upon the overall system. This in turn would influence the number of tracking operations which may be performed simultaneously and may impact upon other operations performed by the processing system.

Figure 13:
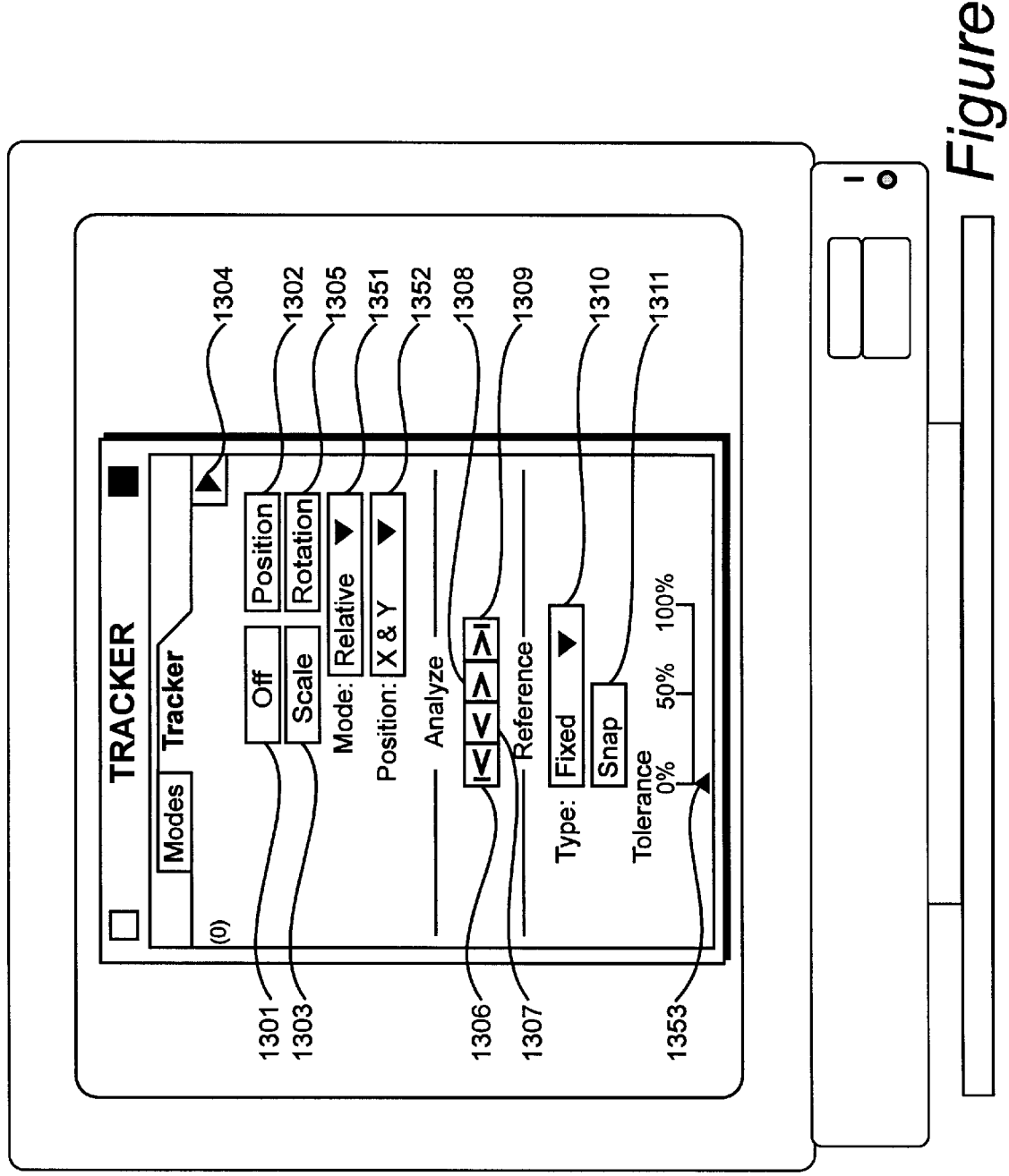
FIG. 13 details the tracker window identified in FIG. 12.

In the specific example, the tracking selection box 602 is positioned within the first frame of an image clip at a distinctive characteristic which represents natural movement within the moving images and for which an animation is to be synchronised. The object to be animated is selected, as shown in FIG. 7 and the nature of the modification, forming the basis for the animation is defined. In this example, object 607 is to be stretched over the duration of the clip. Using a tracker selection window as illustrated in FIG. 13, object position 901 is defined for the first frame in the image clip. Thereafter, by activation of button 1309, the clip is advanced to the last of its frames allowing the object characteristics defined at 902 to be specified. Thus, an animation has been defined by the two extreme values with intermediate values for intermediate frames being determined by a process of interpolation.

Initially, it is assumed that the animation moves linearly from the position shown at 901 to the position shown at 902.

Figure 14:
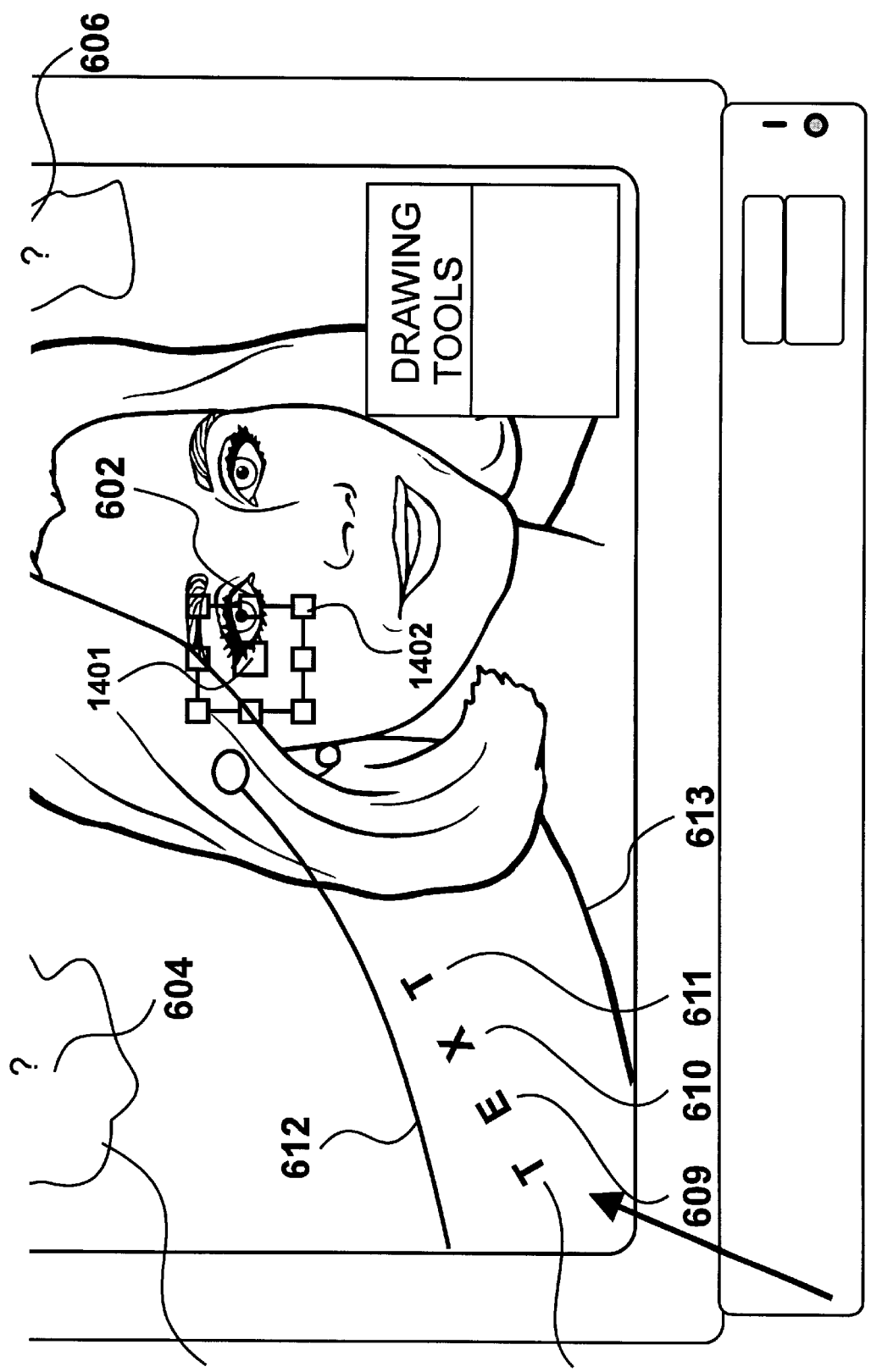
FIG. 14 illustrates detail of the image shown in FIG. 7.

However, this linear relationship is modified in response to parameters determined by the tracking operation. Thus, the tracker is positioned as shown in FIG. 14 and as the clip progresses tracking parameters are generated which are in turn used to control the object's animation properties.

Figure 15:
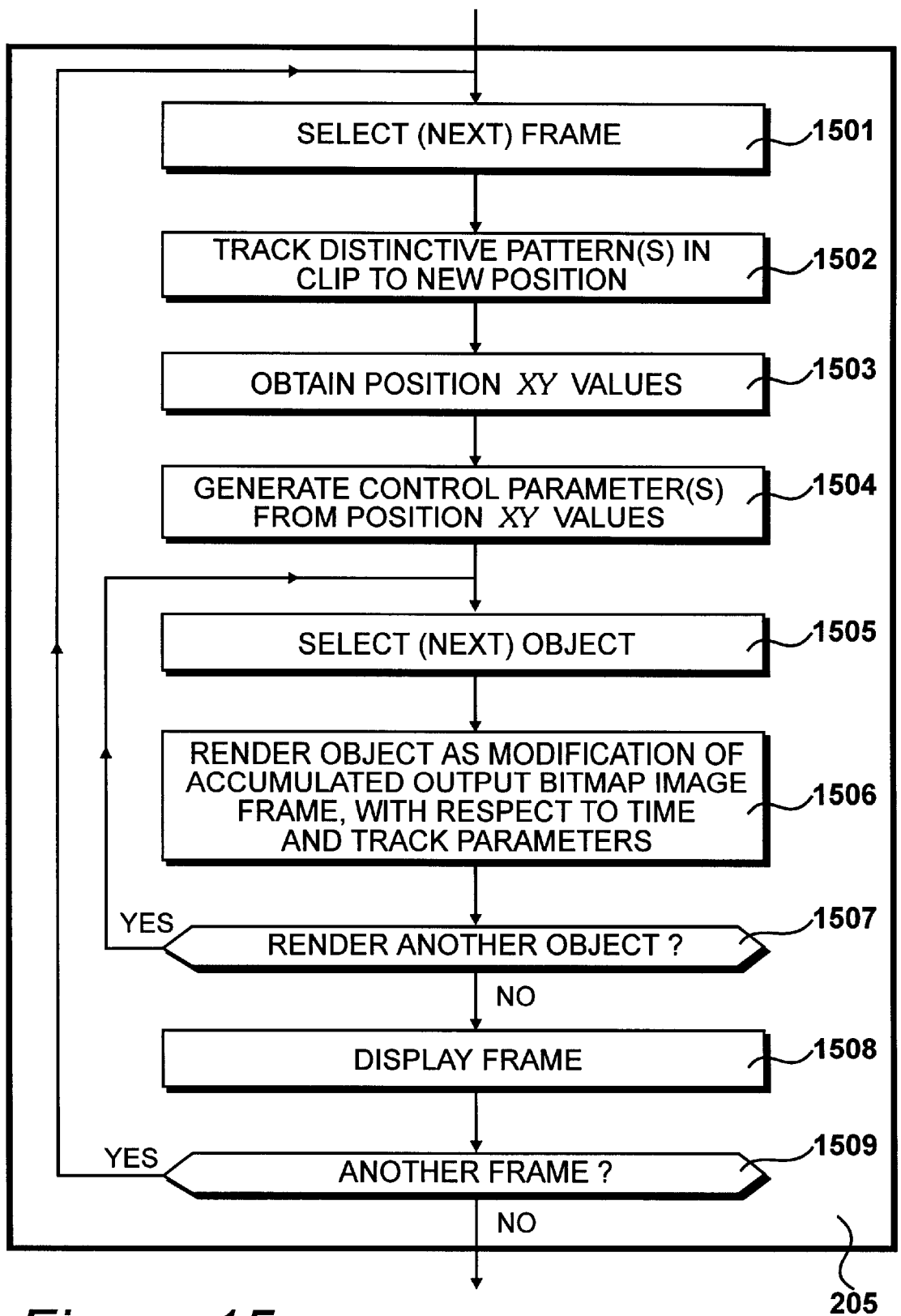
FIG. 15 details the step of rendering an object animation, identified in FIG. 2.

Step 205 for rendering an object animation with the clip is detailed in FIG. 15. The starting position for the tracker is defined manually, as described with reference to FIG. 14, for the first frame of the image clip. Thereafter, the tracking operation attempts to identify a displacement vector for the selected distinctive characteristic on a frame-by-frame basis. At step 1501 the next frame is selected and the distinctive pattern is tracked to identify a displacement vector for the selected frame at step 1502. If two trackers are being used to determine a control parameter for a rotation or scale of an object or group of objects, then a plurality of distinctive patterns will be tracked in the clip to new positions at step 1502. At step 1503 x and y values for the displacement vector are obtained and at step 1504 control parameters are generated from the x and y values obtained at step 1503.

The control parameters generated at step 1504 are consistent with the type of control being performed upon the controlled object. Thus, the generation of control parameters defines the way in which the object will be generated for a particular rendering operation and the process performed at step 1504 contributes towards the population of data structures used during a subsequent rendering process.

Images are rendered on a frame-by-frame basis and the rendering operation consists of rendering each individual object in order to populate a frame buffer. The frame buffer is defined in the Random Access Memory device 302 and the rendering process is initiated by setting all pixel values within the frame to a zero value. Thereafter, the objects are rendered hierarchically and lower layer values may be overwritten or blended when transparent objects are present.

At step 1505 an object is selected and at step 1506 the object selected at step 1505 is rendered by the modification of the accumulated output bitmap image frames with respect to both time and tracker parameters generated at step 1504. At step 1507 a question is asked as to whether another object is to be rendered and when answered in the affirmative control is returned to step 1505 allowing the next object to be selected. The rendering process is repeated for this object at step 1506 and again a question is asked at step 1507 as to whether another object is to be considered. Eventually, all of the objects will have been rendered for the image frame and the question asked at step 1507 will be answered in the negative.

At step 1508 the image frame is displayed and a question is asked at step 1509 as to whether another frame is to be processed. When the question asked at step 1509 is answered in the affirmative, control is returned to step 1501 and the next frame is selected.

It should be appreciated that each frame is displayed at step 1508 before the next tracking data is generated. In this way, the interactive operationality of the system is significantly enhanced allowing improved interactivity in terms of object selection, object parameter selection and track point selection.

Figure 16:
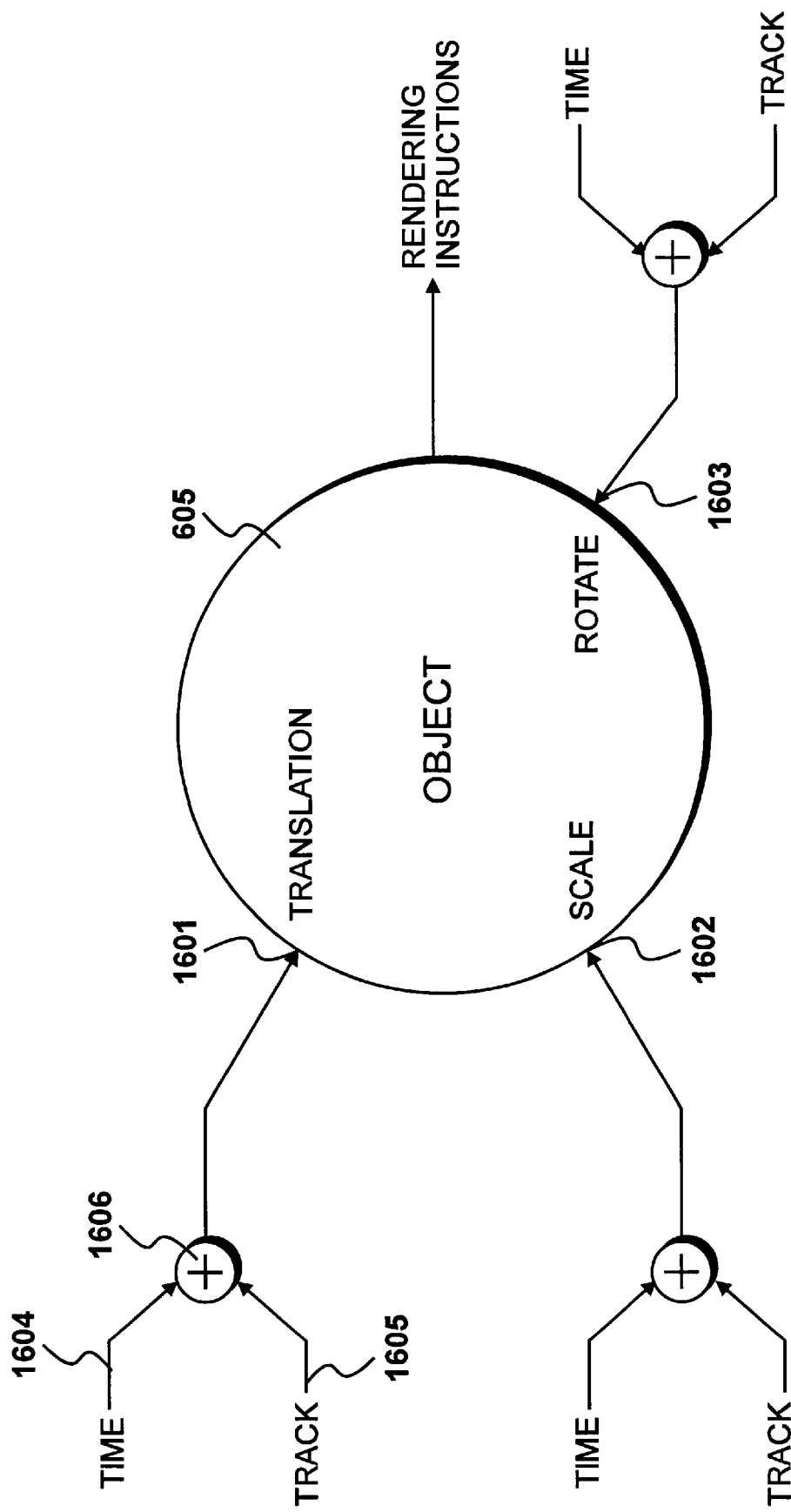
FIG. 16, 17 and 18 illustrates an object of the type identified in FIG. 7.

An object of the type shown in FIG. 7, such as object 605, is represented in FIG. 16. The object has three controllable parameters; namely translation 1601, which controls the position of the object, scale 1602, which controls the size of the object, and rotation 1603, which controls the rotation of the object. Each of these object parameters may be supplied by varying values, as indicated at 1604 and 1605. Varying value 1604 is dependent upon the time within the animation, thus enabling the object to move as time changes. Parameter 1605 represents tracking data supplied from a tracker, such as that indicated at 1602 in FIG. 7. Thus, it is possible to modify the translation of the object 605 with respect to tracking data 1605.

Time and tracking data may be combined by addition 1606, such that the translation of the object may be dependent upon both of these parameters, thus enabling complex manipulations to be performed. Similar control may be effected for scaling 1602 and rotation 1603 of the object 605. However, in order to determine scaling and rotation, it is necessary to obtain a control parameter from a differential position between a pair of trackers. Their relative positions determining a value which may then be used to determine the effects upon scaling and rotation. As time and tracking parameters are defined for each individual frame within a clip or animation, control values for translation, 1601, scale, 1602 and rotation, 1603, are determined. Thus, these values may be supplied as rendering instructions for the object when rendering is performed at process 1506 shown in FIG. 15.

Figure 17:
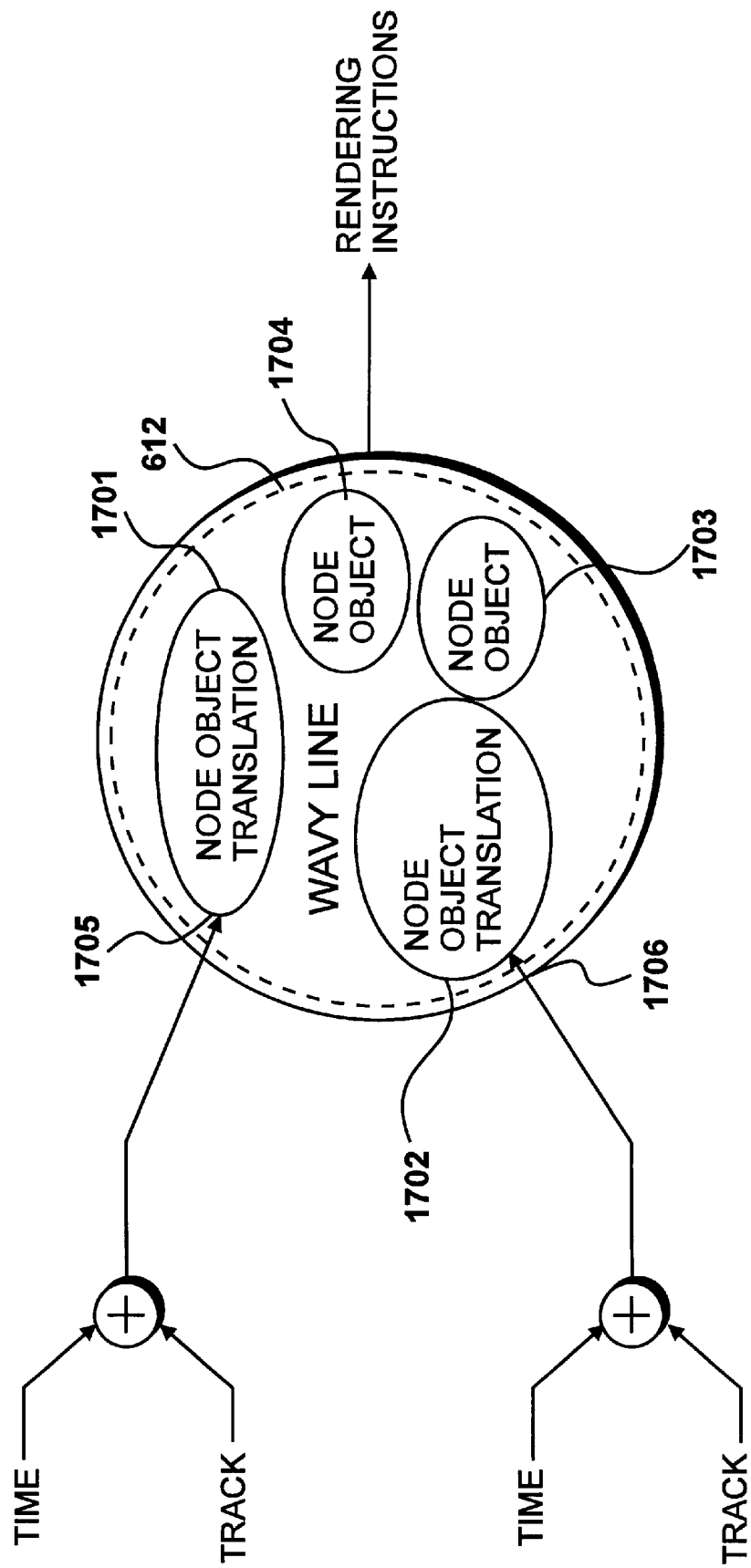

A wavy line object, 612, is represented in FIG. 17. The object 612 comprises several node objects 1701, 1702, 1703 and 1704. In the present embodiment a node object is only capable of translation, such that time and tracking parameters may be combined in order to supply translation modification values to each node object as indicated at 1705 and 1706.

Figure 18:
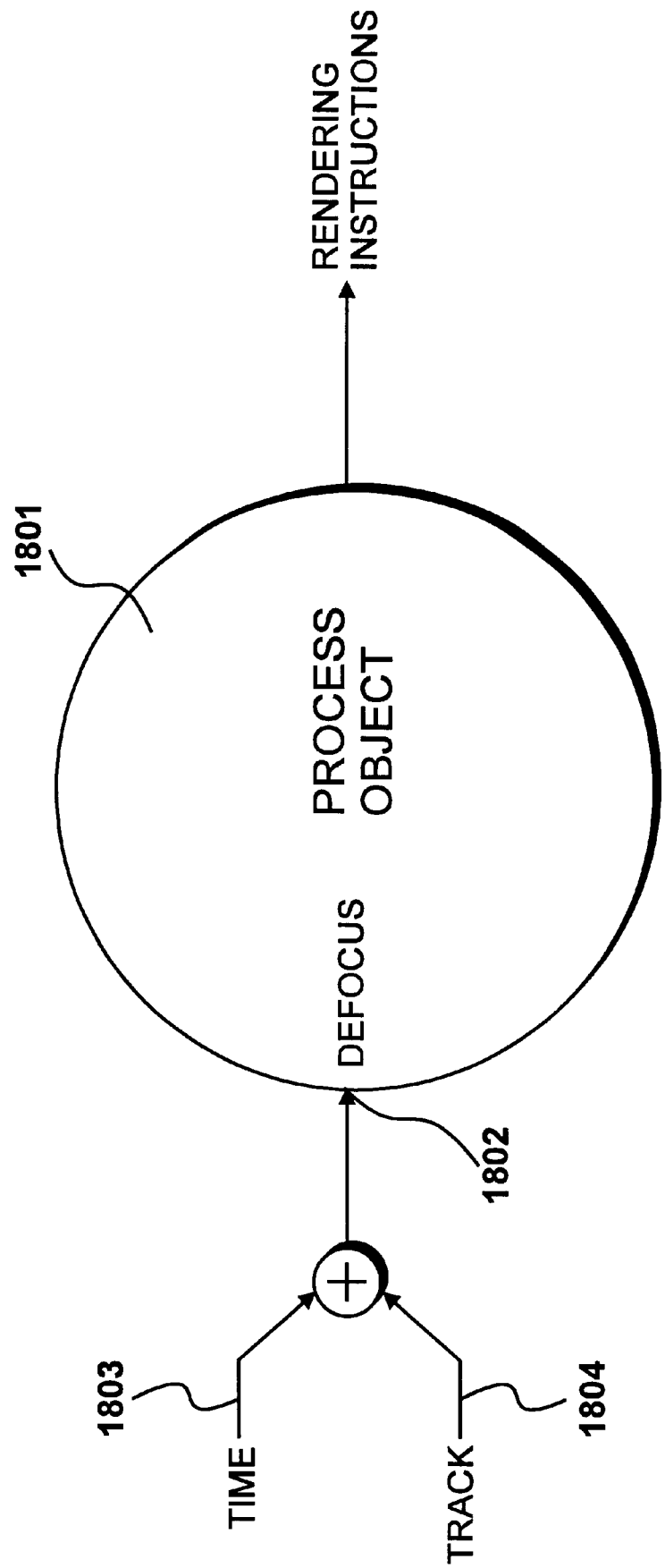

A process object, such as an object which may impart a filtering effect to pixels in the clip, is indicated in FIG. 18. A defocus processing object 1801 receives a defocus modification parameter 1802, which may be modified in response to time 1803 and tracking 1804 parameters. Other types of process objects may be considered in this way, such as a swirling process, where the control parameter for defocus is replaced by a location around which a swirling effect of underlying pixels will be created.

Particle systems or more complex, possibly fractal based, effects may be performed with respect to a single central location which may be defined with respect to time and tracking data, or other complex systems, which may receive one or more control parameters in response to time or tracking or a combination of the two.

Figure 19:
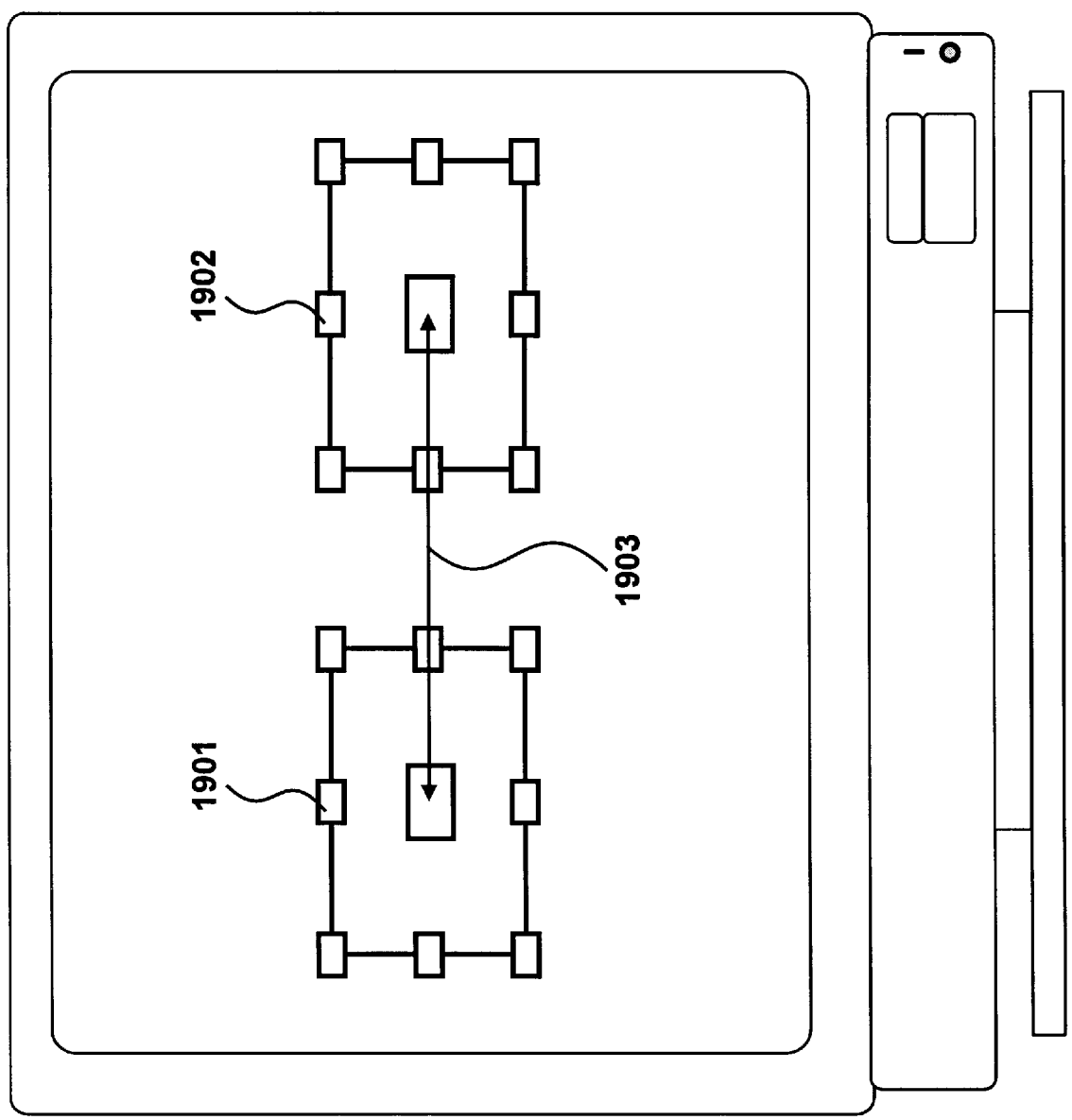
FIG. 19 illustrates the displaying of tracking boxes.

A pair of tracking boxes is shown in FIG. 19. A first tracking box 1901 is separated from a second tracking box 1902 by a distance represented in the Figure by 1903. The distance 1903 may be considered as a changeable value, which may then be used to control scaling or rotation parameters for selected objects.

In the embodiment described so far, objects and images have been considered with reference to a two-dimensional environment. In an alternative preferred embodiment, objects and two-dimensional clips may be represented in a three-dimensional environment. In such an environment, objects may be defined with reference to three-dimensional co-ordinates, and two-dimensional image clips may be projected arbitrarily onto two-dimensional planes which have been defined within the three-dimensional environment. In the alternative embodiment, there is no restriction on the ability to track imported two-dimensional clips, and to link tracked points within those clips to properties of objects defined within the three-dimensional environment.

Figure 20:
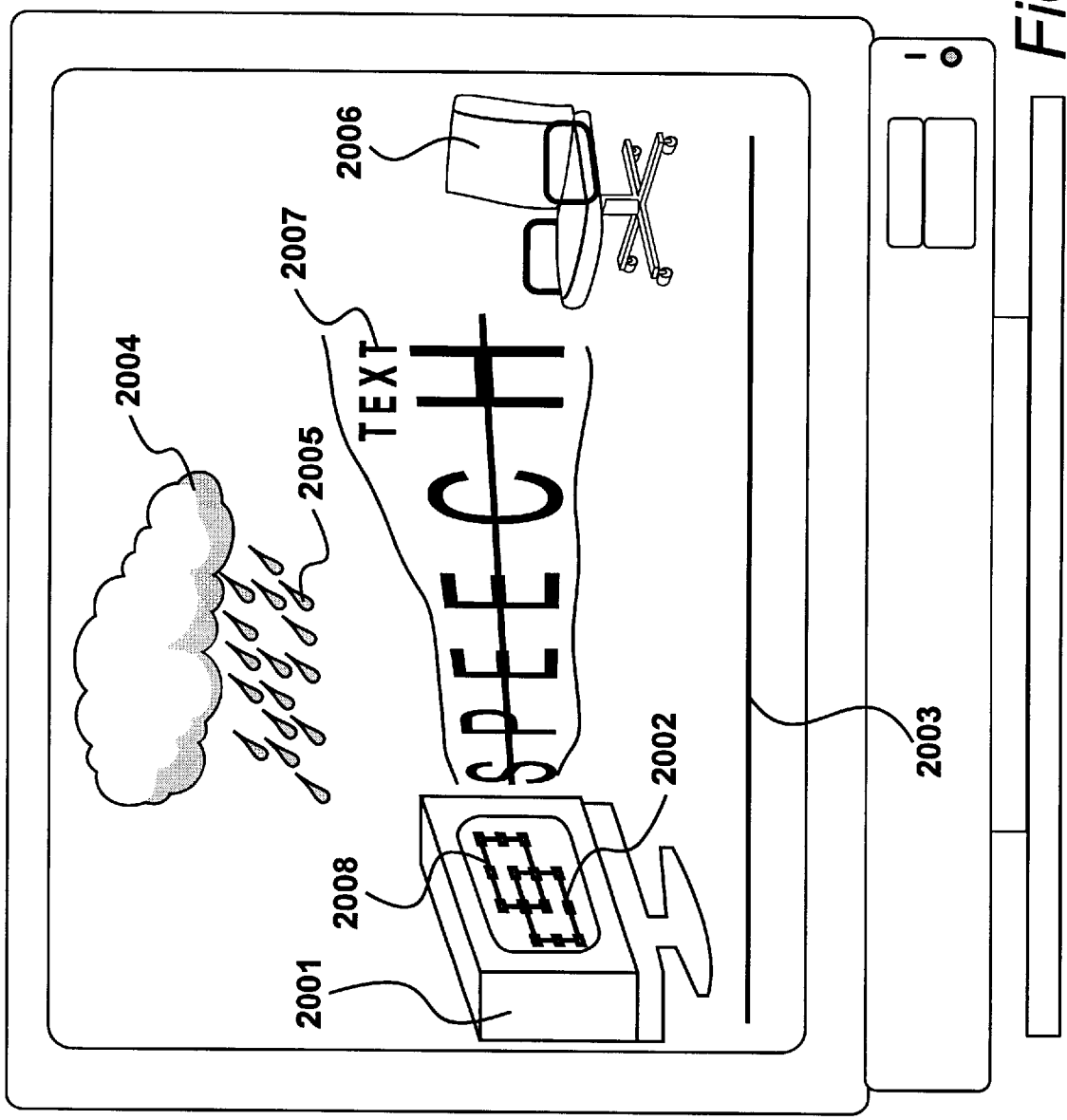
FIG. 20 illustrates a composited image produced by the process described herein.

Such an environment is indicated in FIG. 20. A three-dimensional object such as a television set 2001 has been defined, including a flat two-dimensional surface 2002 onto which has been project a two-dimensional clip. The three-dimensional scene further includes a floor 2003, a rain cloud 2004 with rain 2005, a rotating swivel chair 2006 and a three-dimensional sample of text 2007, similar to that indicated in the two-dimensional environment shown in FIG. 7.

The cloud object 2004, the rain object 2005, the text object 2007 and the swivel chair object 2006 are all capable of rotation, scaling and translation within the three-dimensional space. A tracker has been defined for operation with respect to the two-dimensional plane which has been projected onto the television set 2001, the tracker object, although not operating with reference to the three-dimensional environment, may be seen, as shown at 2008. The tracker object 2008 is able to follow a selected pointer within the projected two-dimensional clip such that translation effects of the objects 2004, 2005, 2006 and 2007 may be produced in three-dimensions. Scaling and rotation may be accomplished by using a pair of tracker boxes. In this way a highly "organic feel" may be obtained for movements of the objects in the three-dimensional environment, compared to when a smoothly flowing control parameter, such as time, is used to affect movement.

What we claim is:

1. Image data processing apparatus configured to process image data representing a moving image by a sequence of image frames, wherein each of said image frames contains an array of pixels, the apparatus comprising:

identifying means configured to identify a distinctive characteristic of an image frame defined by pixel transitions;

defining means configured to display a control window for defining a parameter of the distinctive characteristic;

generating means configured to generate a tracking parameter in response to tracking a position of said distinctive characteristic;

controlling means configured to control an object with respect to the defined parameter in response to said tracking parameters; and display means configured to display an output image in response to the application of said controlled object upon an image frame.

2. Apparatus according to claim 1, wherein said identifying means is configured to identify a plurality of distinctive characteristics, said generating means is configured to generate a first tracking parameter in response to tracking the position of a first distinctive characteristic, and configured to generate a second tracking parameter in response to tracking the position of a second distinctive characteristic and to generate a combined tracking parameter by combining said first tracking parameter and said second tracking parameter, wherein said controlling means is configured to control said object in response to said combined tracking parameter.

3. Apparatus according to claim 2, wherein said combined tracking parameter controls a scale of said object.

4. Apparatus according to claim 2, wherein said combined tracking parameter controls a rotation of said object.

5. Apparatus according to claim 2, wherein tracking parameters control a plurality of position, scale or rotation of said object.

6. Apparatus according to claim 1, wherein said tracking parameter controls a position of said object.

7. Apparatus according to any of claims 1 to 6, wherein said object is a user selected object.

8. Apparatus according to any of claims 1 to 6, wherein said object comprises a group of user selected objects.

9. Apparatus according to claim 1, wherein an instruction sequence for said generating means is associated with user selected groups of objects in response to a tracking request, said controlling means is configured to identify additional associations performed in response to additional tracking requests, and said generating means is configured to generate tracking parameters independently by repeating said instruction sequences for each of said associations.

10. Apparatus according to claim 9, wherein said associations are stored in response to a user request for association storage.

11. Apparatus according to claim 1, wherein said identifying means is configured to identify a distinctive characteristic of an image and thereby track said image, and is configured to select a reference area that includes said distinctive characteristics, identify a search area that includes said reference area, activate a search mode responsive to an identification of a preferred method for said step of identifying reference areas, measure a correlation of potential search match areas, and select one of said search match areas or a predicted position, dependent upon said correlation measurements.

12. Apparatus according to claim 1, wherein said controlling means is configured to control said object in response to a plurality of combined parameters, including said tracking parameter.

13. A method of modifying image data representing a moving image by a sequence of image frames each containing an array of pixels, the method comprising:

(a) identifying a distinctive characteristic of an image frame defined by pixel transitions;

(b) defining a parameter of the distinctive characteristic through a control window display; and (c) modifying image data in response to a plurality of process iterations, wherein each of said process iterations comprises:

(i) generating a tracking parameter in response to tracking the position of said distinctive characteristic;

(ii) controlling an object with respect to the defined parameter in response to said tracking parameter; and (iii) displaying an output image in response to the application of said controlled object upon an image frame.

14. A method according to claim 13, wherein:

a plurality of distinctive characteristics are tracked, a first tracking parameter is generated in response to tracking the position of a first said distinctive characteristic;

a second tracking parameter is generated in response to tracking the position of a second said distinctive characteristic;

a combined tracking parameter is generated by combining said first and second tracking parameters; and said object is controlled in response to said combined tracking parameter.

15. A method according to claim 14, wherein said combined tracking parameter controls a scale of said object.

16. A method according to claim 14, wherein said combined tracking parameter controls a rotation of said object.

17. A method according to claim 14, wherein tracking parameters control a plurality of position, scale or rotation of said object.

18. A method according to claim 13, wherein said tracking parameter controls a position of said object.

19. A method according to any of claims 13 to 18, wherein said object is a user-selected object.

20. A method according to any of claims 13 to 18, wherein said object comprises a group of user-selected objects.

21. A method according to claim 13, wherein:
an instruction sequence for generating a tracking parameter is associated with user-selected groups of objects in response to a tracking request;
additional associations are performed in response to additional tracking requests; and
tracking parameters are generated independently by repeating said instruction sequence for each said association.

22. A method according to claim 21, wherein said associations are stored in response to a user request for association storage.

23. A method according to claim 13, wherein said tracking of the position of said distinctive characteristic comprises:
selecting a reference area that includes said distinctive characteristic;
identifying a search area that includes said reference area;
activating a search mode responsive to an identification of a preferred method for identifying reference areas;
measuring a correlation of potential search match areas; and
selecting one of said search match areas or a predicted position, dependent upon said correlation measurements.

24. A method according to claim 13, wherein said object is controlled in response to a plurality of combined parameters, including said tracking parameter.

25. A method of modifying scene data representing objects in three dimensional space, wherein said scene includes a two-dimensional image projection that changes over time, the method comprising:
identifying a distinctive characteristic in said two-dimensional image by analyzing image pixel data;
defining a parameter of the distinctive characteristic through a control window display;
generating a tracking parameter in response to tracking the position of said distinctive characteristic in said two-dimensional image;
controlling an object in said three dimensional space with respect to said defined parameter in response to said tracking parameter; and
generating an output image of said scene, including said controlled object.

26. A method according to claim 25, wherein a scene object is selected for animation in response to a time parameter.

27. A method according to claim 25, wherein a scene object is selected for animation in response to a combined time and tracking parameter.

28. A method according to claim 26 or claim 27, wherein a scene object is identified in response to a user-selection.

29. A method according to claim 26 or claim 27, wherein a scene object is identified in response to a user-selection, and comprises a group of objects.

30. A method according to claim 25, wherein said scene object is selected for control in response to a tracking parameter generated in response to the measured relative position of a plurality of tracked distinctive characteristics in said two-dimensional image.

31. A method according to claim 25, wherein said scene object is selected for animation in response to a non-tracking parameter.

32. A method according to claim 31, wherein said non-tracking parameter is a time parameter.

33. A computer system programmed in response to executable instructions to modify image data representing a moving image by a sequence of image frames each containing an array of pixels, said system being configured to:
(a) identify a distinctive characteristic of an image frame defined by pixel transitions;
(b) define a parameter of the distinctive characteristic through a control window display; and
(c) modify image data in response to a plurality of process iterations, wherein each of said process iterations comprises;
(i) generating a tracking parameter in response to tracking the position of said distinctive characteristic, controlling an object with respect to said defined parameter in response to said tracking parameter, and
(ii) displaying an output image in response to the application of said controlled object upon an image frame.

34. A computer system according to claim 33, programmed to track a plurality of distinctive characteristics, such that a first tracking parameter is generated in response to tracking the position of a first distinctive characteristic, a second tracking parameter is generated in response to tracking the position of a second distinctive characteristic, a combined tracking parameter is generated by combining said first and second tracking parameters, and said object is controlled in response to said combined tracking parameter.

35. A computer system programmed according to claim 34, further programmed to:
generate a first tracking parameter in response to tracking the position of a first distinctive characteristic;
generate a second tracking parameter in response to tracking the position of a second distinctive characteristic;
generate a combined tracking parameter by combining said first tracking parameter and said second tracking parameter; and
control said object in response to said combined tracking parameter.

36. A computer system programmed according to claim 34, further programmed to:
associate a tracking parameter with user selected groups of objects in response to a tracking request;
perform additional associations in response to additional tracking requests; and
generate tracking parameters independently by repeating said instruction sequence for each of said associations.

37. A computer-readable medium having computer-readable instructions executable by a computer such that said computer performs the steps of:
(a) identifying a distinctive characteristic of an image frame defined by pixel transitions;
(b) defining a parameter of the distinctive characteristic through a control window display; and
(c) modifying image data in response to a plurality of process iterations, wherein each of said process iterations comprises:
(i) generating a tracking parameter in response to tracking the position of said distinctive characteristic, (ii) controlling an object with respect to said defined parameter in response to said tracking parameter, and (iii) displaying an output image in response to the application of said controlled object upon an image frame.

38. A computer-readable medium according to claim 37, having computer-readable instruction executable by a computer such that said computer performs the further steps of:

selecting a reference area that includes said distinctive characteristic, identifying a search area that includes said reference area, activating a search mode responsive to an identification of a preferred method for said step of identifying reference areas, measuring a correlation of potential search match areas, and selecting one of said search match areas or a predicted position, dependent upon said correlation measurements.

39. A computer-readable medium having computer readable instructions executable by a computer such that said computer performs the steps of:

identifying a distinctive characteristic in a two-dimensional image of a scene by analyzing image pixel data;

defining a parameter of the distinctive characteristic through a control window display; and generating a tracking parameter in response to tracking a position of said distinctive characteristic in said two-dimensional image;

controlling an object in three-dimensional space with respect to the defined parameter in response to said tracking parameter; and generating an output image of said scene, including said controlled object.

40. A computer-readable medium according to claim 39, having computer-readable instructions executable by a computer such that said computer performs the further steps of:

selecting said scene object for control in response to a tracking parameter, wherein said tracking parameter is generated in response to the measured relative position of a plurality of tracked distinctive characteristics in said two-dimensional image.

* * * * *